United States Patent [19]

Lemberger et al.

[11] Patent Number: 5,229,585
[45] Date of Patent: Jul. 20, 1993

[54] FILM CARTRIDGE BAR CODE SCANNER AND CONTROLLER FOR A DIGITAL IMAGING SYSTEM

[75] Inventors: Richard R. Lemberger; Terrence H. Joyce, both of St. Paul, Minn.

[73] Assignee: Minnesota Mining and Manufacturing Company, St. Paul, Minn.

[21] Appl. No.: 656,605

[22] Filed: Feb. 19, 1991

[51] Int. Cl.⁵ .................................. G06F 15/60
[52] U.S. Cl. ............................. 235/375; 354/21; 358/302
[58] Field of Search .................. 235/375; 355/41; 354/21; 358/302

[56] References Cited

U.S. PATENT DOCUMENTS

| | | |
|---|---|---|
| 3,961,164 | 6/1976 | Reed et al. |
| 4,173,401 | 11/1979 | Harvey ............................. 354/21 |
| 4,324,484 | 4/1982 | Johnson ............................. 355/5 |
| 4,598,986 | 7/1986 | Shiratori et al. ................. 354/21 |
| 4,727,391 | 2/1988 | Tajima et al. ................... 354/277 |
| 4,736,215 | 4/1988 | Hudspeth et al. ............... 354/21 |
| 4,782,219 | 11/1988 | Crater ............................. 235/462 |
| 4,839,737 | 6/1989 | Saito ................................ 358/257 |
| 4,930,016 | 5/1990 | Yazawa et al. .................. 358/296 |
| 4,982,224 | 1/1991 | Yamamoto et al. ............. 355/41 |
| 5,008,700 | 4/1991 | Okamoto .......................... 355/41 |
| 5,057,913 | 10/1991 | Nagata et al. .................. 358/302 |
| 5,097,342 | 3/1992 | Agano ............................. 358/302 |

FOREIGN PATENT DOCUMENTS 2601539 1/1988 France .
63-166972 1/1986 Japan .

OTHER PUBLICATIONS

Brochure Sharp GP2S05/GP2S15—Photointerrupters pp. 754–757.
Brochure—3M/Medical Imag. System Division—Technical Information Sheet 3M Laser Imager.

Primary Examiner—John Shepperd
Assistant Examiner—Esther H. Chin
Attorney, Agent, or Firm—Gary L. Griswold; Walter N. Kirn; William D. Bauer

[57] ABSTRACT

A laser imaging system includes a cartridge of photographic film, a laser imager, a film processor and an image management system responsive to image input data for controlling the imager and film processor. An optical bar code with a unique cartridge ID, film size, film type information and film sensitometric information is attached to the cartridge. The laser imager includes a cartridge receiving mechanism, a cartridge opening mechanism, a laser scanning system and an optical scanner mounted to the cartridge opening mechanism. Information is read from the bar code as the cartridge is opened. The image management system controls the laser imager as a function of the input data and the sensitometric information read from the bar code. The image management system causes the film processor to develop the film as a function of the film type information read from the bar code.

12 Claims, 5 Drawing Sheets

FILM CARTRIDGE BAR CODE SCANNER AND CONTROLLER FOR A DIGITAL IMAGING SYSTEM

BACKGROUND OF THE INVENTION

The present invention relates generally to laser imaging control systems. In particular, the present invention is a film cartridge bar code scanner and controller for a digital laser imaging system.

Laser imaging systems are commonly used to produce photographic images from digital image input data generated by magnetic resonance (MR), computed tomography (CT) or other types of scanners. Systems of this type can include a continuous tone laser imager for exposing the image on photographic film, a film processor for developing the film, and an image management system (IMS) for coordinating the operation of the laser imager and film processor.

The image input data is typically a sequence of digital values representative of the scanned image. Image processing electronics within the IMS processes the input data to generate a sequence of digital exposure values, each of which is representative of one of a plurality of intensity levels (eg., a grey scale) at a discrete pixel location on the image. The image processing electronics scales and maps the range of scanned input data values to a range of exposure values which will produce a useful, continuous tone photographic image. This mapping operation is necessitated by the nonlinear relationship between the input data and its visual representation, and the nonlinear sensitometric response of the photographic film to different intensities of light. The image processing electronics typically includes a lookup table of stored data characterizing the input data to exposure value transfer function. The lookup table is accessed by the image processing electronics as a function of the input data values to determine associated exposure values.

X-ray and other types of medical imaging photographic film are packaged in optically opaque containers. The film is usually removed from these containers and loaded in an insertable cartridge under darkroom conditions. The cartridge is then loaded into the laser imager. This is an inconvenient and time consuming task.

Known laser imaging systems commercially available from the 3M Company of St. Paul, MN are configured to receive different types of film having a variety of sensitometric (light sensitivity) characteristics. Since the overall image input value to exposure value transfer function is dependent upon the film sensitometry, parameters of these imaging systems must be adjusted for the particular film being used. Contrast and density controls interfaced to the IMS are manually actuated by an operator to accommodate different types of film in the 3M laser imagers referred to above. These adjustments are made on a trial and error basis with test patterns, an inconvenient and inefficient procedure.

Commonly assigned U.S. Patent application Ser. No. 07/656,734, entitled "Opening and Closing Mechanism For a Laser Imager Film Cartridge", which was filed on even date herewith, discloses a resealable imaging film cartridge and an opening and closing mechanism for use therewith. The opening and closing mechanism enables resealable cartridges with different sizes and types of film to be conveniently loaded into and removed from the laser imager. Unfortunately, the setup procedures described above must be performed by the operator each time a cartridge of film with different characteristics is loaded into the imager. The convenience advantages associated with the resealable cartridge and associated opening and closing mechanism are thereby diminished.

It is evident that there is a continuing need for improved control systems for laser imaging systems. The control system should enable an operator to quickly and conveniently configure the imaging system for different types of film. Other controlled functions which enable more precise control over the imaging system without requiring greater operator attention are also desirable. To be commercially viable, the control system must be reliable and of an efficient design.

BRIEF DESCRIPTION OF THE DRAWINGS

FIG. 7 is a side view of the cartridge receiving tray.

SUMMARY OF THE INVENTION

The present invention is a laser imaging system including a cartridge of photographic film, a machine readable information bearing medium associated with the cartridge, a laser imager and an image management system. Information characterizing the cartridge and/or the film is encoded on the information bearing medium. The laser imager includes a mechanism for receiving the film cartridge, a laser scanning system for imaging the film and a reading device for reading the information from the information bearing medium. The image management system is responsive to image input data and controls the laser imager as a function of the input data and the information read from the information bearing medium. This system is efficient and reliable, and can be conveniently used with cartridges of different sizes and types of film.

In one embodiment the information bearing medium is an optical bar code label adhesively attached to the cartridge. The laser imager further includes a cartridge opening mechanism mounted for movement with respect to the cartridge receiving mechanism, and a drive for driving the opening mechanism. The reading device is an optical scanner mounted to the opening mechanism. The information is read from the bar code as the cartridge is being opened.

In another embodiment the imaging system also includes a display. Unique cartridge ID information is encoded on the information bearing medium. The image management system stores film usage information representative of the amount of film remaining within each cartridge, and drives the display as a function of this information.

In yet another embodiment, the information bearing medium includes sensitometric information for the film in the cartridge. The image management system includes image processing electronics for processing the input data as a function of the sensitometric information.

Still other embodiments of the system include a film processor. Film type information representative of the type of film in the cartridge is encoded onto the information bearing medium. The image management system causes the film processor to develop the film as a function of the film type information.

DETAILED DESCRIPTION OF THE PREFERRED EMBODIMENTS

Figure 1:
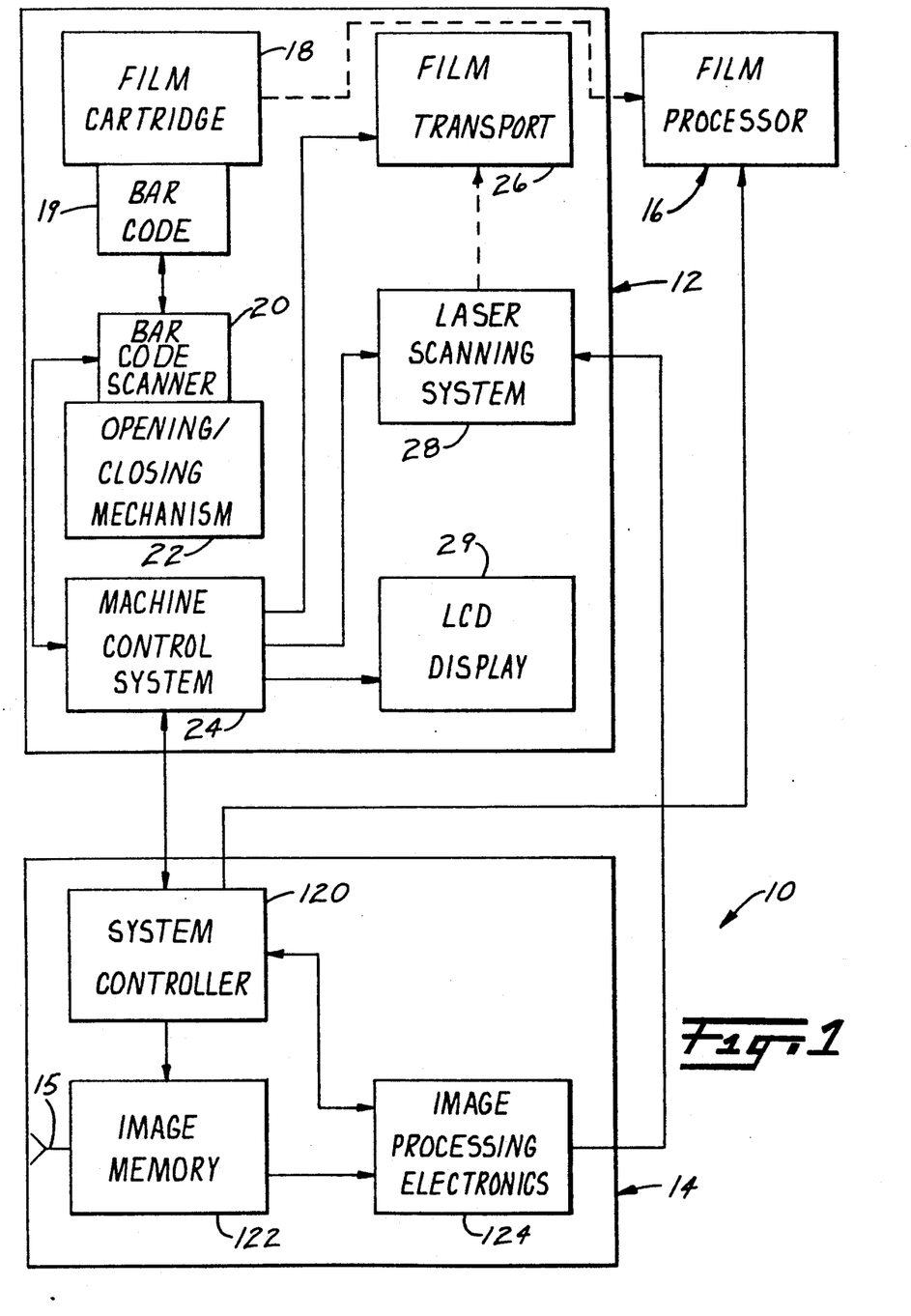
FIG. 1 is a block diagram representation of a laser imaging system in accordance with the present invention.

A laser imaging system 10 in accordance with the present invention is illustrated generally in FIG. 1. Imaging system 10 includes imager 12, image management system (IMS) 14 and film processor 16. Imager 12 is a continuous tone laser imager in one embodiment, and is configured to receive a cartridge 18 containing sheets of photographic film (not separately shown). IMS 14 includes an input port 15 through which image input data generated by a magnetic resonance (MR), computed tomography (CT) or other type of scanner is provided to imaging system 12. Imager 12 and IMS 14 use the image input data to image or expose film from cartridge 18. The imaged film is subsequently developed by processor 16 to produce a hardcopy of the image.

A medium bearing encoded machine readable cartridge/film information is associated with cartridge 18. In the embodiment shown in FIG. 1, the medium is an optical bar code 19 which is affixed to cartridge 18. The film/cartridge information is read from bar code 19 by a device such as optical scanner 20. In addition to scanner 20, imager 12 includes cartridge opening/closing mechanism 22, microprocessor-based machine control system 24, film transport mechanism 26 LCD display 29 and laser scanning system 28. Bar code scanner 20 is mounted to opening/closing mechanism 22 in the embodiment shown.

Machine control system 24 coordinates and controls the operation of imager 12, and interfaces the imager with IMS 14. After a film cartridge 18 has been loaded into imager 12, machine control system 24 actuates opening/closing mechanism 22 to open cartridge 18 while scanner 20 is simultaneously driven across bar code 19. All of the information read from bar code 19 is transferred to IMS 14 by machine control system 24, while some information is used by the control system to an imager 12. Film transport 26 removes a sheet of film from the opened cartridge 18 and drives the film through an imaging station (not separately shown) under the control of machine control system 12. As the film is being driven through the imaging station, IMS 14 and machine control system 24 causes laser scanning system 28 to expose the film as a function of both the image input data and the data read from bar code 19. The imaged film is subsequently driven to film processor 16 by transport 26. IMS 14 is interfaced to film processor 16, and causes the processor to develop the film as a function of the data read from bar code 19. This system facilitates a high degree of control over the imaging and developing processes.

Figure 2:
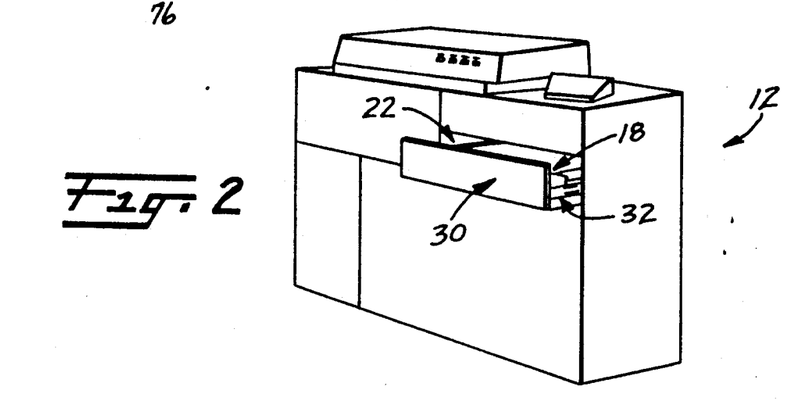
FIG. 2 is an illustration of the laser imager shown in FIG. 1.

Imager 12 is illustrated generally in FIG. 2. As shown, imager 12 includes a drawer 30 which is opened to provide access to a cartridge-receiving base 32 into which film cartridge 18 is loaded. Opening/closing mechanism 22 is mounted to drawer 22 for movement with respect to base 32. After film cartridge 18 has been loaded into base 32, drawer 30 is closed to seal the cartridge within a light-tight compartment.

Figure 3:
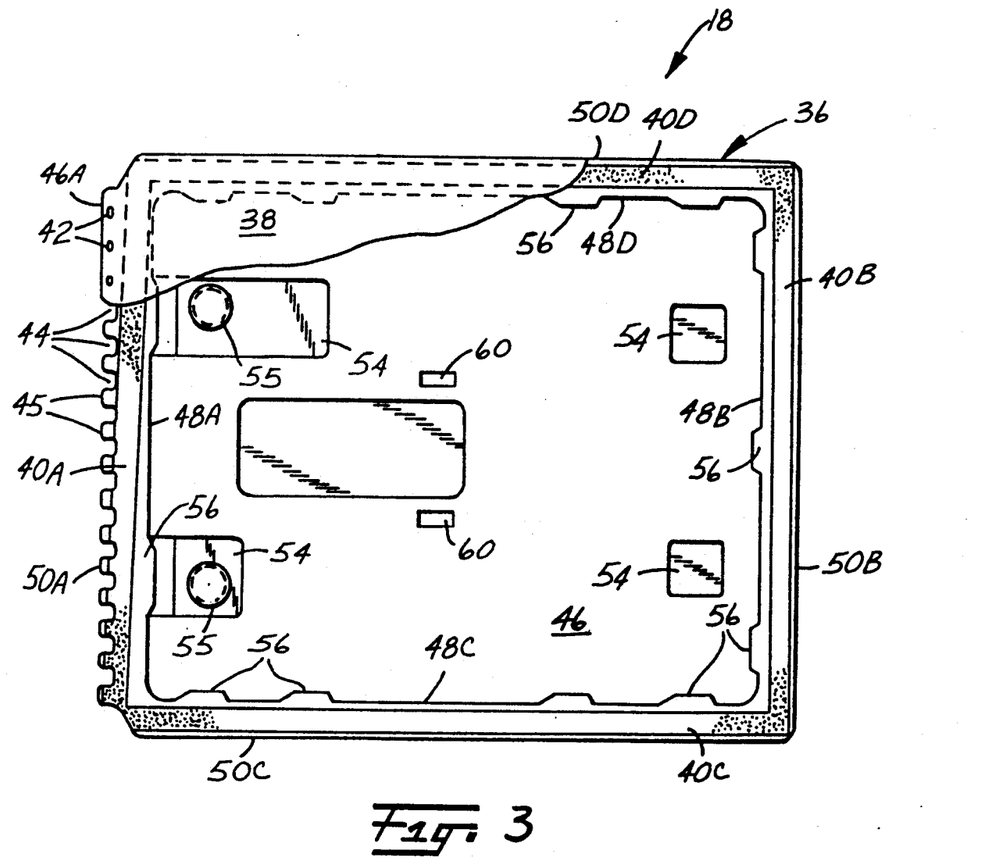
FIG. 3 is top view of the cartridge shown in FIG. 1, with a portion of the cover broken away.
Figure 4:
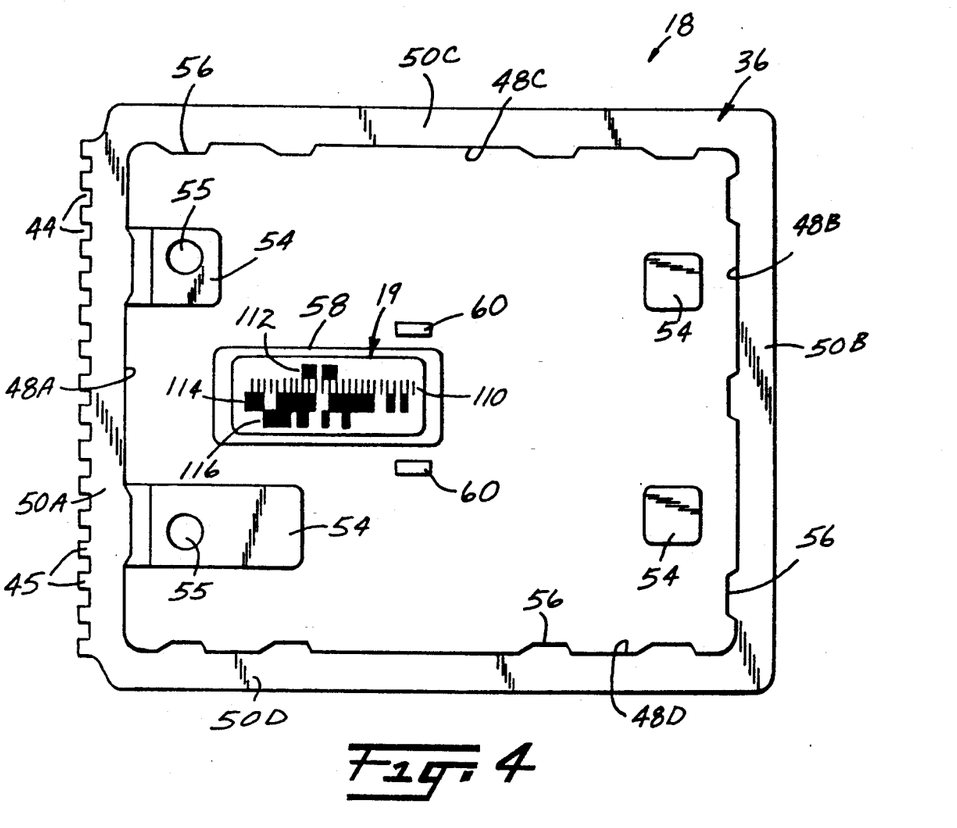
FIG. 4 is a bottom view of the cartridge.
Figure 5:
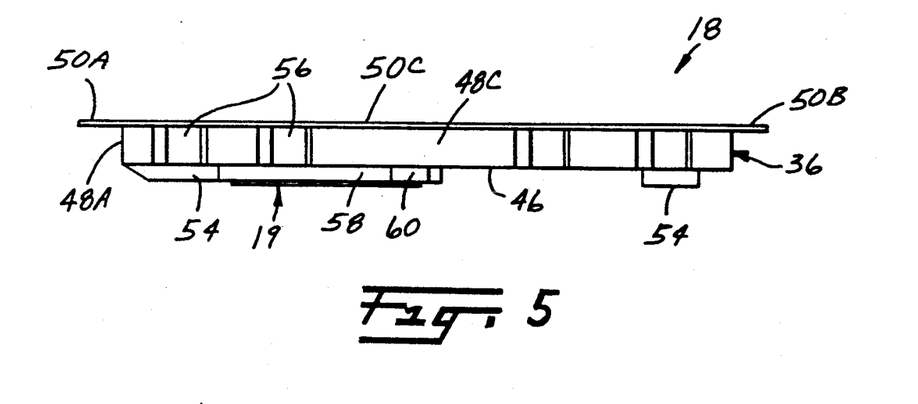
FIG. 5 is a side view of the cartridge.

Resealable cartridge 18 can be described in greater detail with reference to FIGS. 3–5. As shown, cartridge 18 includes an optically opaque polymer film-receiving tray 36 and a flexible, optically opaque polymer cover 38 resealably mounted to the tray by optically opaque adhesive segments 40A–40D. Tray 36 is preferably molded in one piece from a relatively inexpensive and photo-inert polyolefin so that it is economically feasible to dispose of cartridge 18 following a single use. Tray 36 includes a generally planar bottom wall 46, front wall 48A, back wall 48B, and side walls 48C and 48D. Lips 50A–50D extend outwardly from the upper edges of respective walls 40A–40D, and circumscribe a film access opening of tray 36. Adhesive segments 40A–40D are positioned on lips 50A–50D, respectively. The forwardmost or leading edge of front lip 50A includes a number of cutouts 44 spaced from each other by projections 45. Cover 38 is a flexible and photo-inert sheet of material sized to extend over the film access opening of tray 36 and mate with adhesive segments 40A–40D. In one embodiment, cover 38 is a metal foil, polymer sheet laminate. Front edge 46A of cover 38 includes a number of spaced apertures 42 which overlie cutouts 44 on tray lip 50A. Cover apertures 42 are engaged by opening/closing mechanism 22 to peel cover 38 from tray 36.

Cartridge tray 36 also includes feet 54, film guides 56, bar code mounting platform 58 and platform spacers 60, all of which can be molded into the tray as it is manufactured. Feet 54 extend downwardly from bottom wall 46 and support cartridge 18 within base 32 of imager 12. Positioning lug recesses 55 extend into feet 54 from the exterior of tray 36. Guides 56 extend inwardly from walls 48A–48D to properly position sheets of film within tray 36. Bar code platform 58 is a planar surface formed by a recess in bottom wall 46, and functions as a mounting area for bar code 19. Platform spacers 60 are also formed as recesses in bottom wall 46, and are positioned closely adjacent to bar code mounting platform 58.

Figure 6:
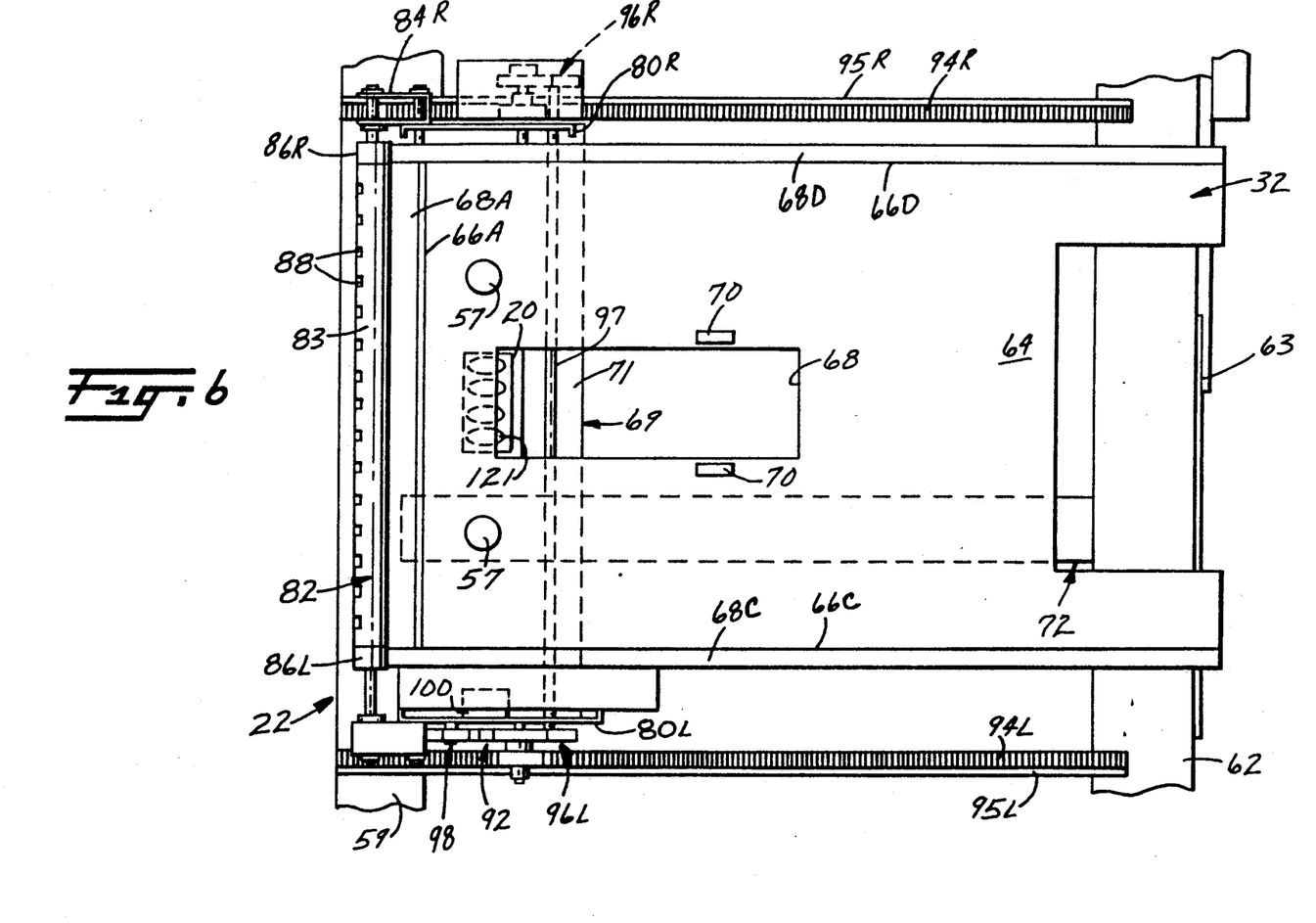
FIG. 6 is a top view of the cartridge receiving tray and the opening and closing mechanism shown in FIG. 2.

Base 32 and opening/closing mechanism 22 are illustrated in greater detail in FIGS. 6 and 7. Drawer 30 includes a pair of frame members 59 and 62 which are mounted to telescopic tracks 61 and 63, respectively, for reciprocal linear motion into and out of the light-tight compartment of imager 12. Base 32 is mounted to frame members 59 and 62 and includes a bottom wall 64, front wall 66A and side walls 66C and 66D. Lips 68A, 68C and 68D extend outwardly from the upper edges of base walls 66A, 66C and 66D, respectively. Bottom wall 64 also includes a scanner access opening 68. A pair of tray supports 70 extend upwardly from bottom wall 64 and are positioned to engage the tray platform spacers 60. A pair of positioning lugs 57 also extend upwardly from bottom wall 64 and are positioned to receive recesses 55 in cartridge feet 54.

Opening/closing mechanism 22 includes carriage 69, pressure roller 82 and carriage drive assembly 92. Carriage 69 includes an elongated base plate 71 mounted to guide track 72 for reciprocal linear motion below base 32. Guide track 72 includes an elongated track member 74 oriented parallel to the carriage path of motion (perpendicular to base front wall 66A) and having its opposite ends mounted to drawer frame members 59 and 62. Guide track 72 also includes a slide member 76 mounted to the lower side of base plate 71 and slidably engaged with track member 74. Carriage 69 includes a pair of uprights 80L and 80R which extend upwardly from base plate 71 at locations beyond the outer edges of base lips 68C and 68D, respectively. Pressure roller 82 is an elongated member swingably mounted to carriage uprights 80L and 80R by brackets 84L and 84R, respectively. Ends 86L and 86R of pressure roller 82 have a circular cross section and are aligned with side lips 68C and 68D of base 32, respectively. The portion 83 of pressure roller 82 between ends 86L and 86R is half circular in cross section, and includes cartridge cover-engaging fingers 88. Fingers 88 and cartridge cover apertures 42 are positioned with respect to one another so as to be aligned when cartridge 18 is loaded into base 32. Pressure roller 82 is biased toward engagement with base lips 68A, 68C and 68D by a pair of springs (not visible in FIGS. 6 and 7) which are connected between respective brackets 84L and 84R and carriage uprights 80L and 80R.

Carriage 69 and pressure roller 82 are driven by carriage drive assembly 92. Drive assembly 92 includes racks 94L and 94R, track gear drive assemblies 96L and 96R, roller gear drive assembly 98, motor 100 and a solenoid actuated linkage (not shown), all of which are mounted to carriage 69. Bar code scanner 20 is mounted to carriage base plate 71 in line with scanner access opening 68 of base 32. Racks 94R and 94L are mounted teeth side up to brackets 95R and 95L, respectively, which extend between frame members 59 and 62.

Film cartridge 18 is loaded into opened drawer 30. When cartridge 18 is properly positioned, lugs 57 will extend into recesses 55 of feet 54 and lips 50A, 50C and 50D will be supported by base lips 68A, 68C and 68D respectively. Bar code platform 58 is properly spaced from scanner 20 by the engagement of platform spacers 60 with tray supports 70, thereby enabling scanner 20 to accurately and reliably read bar code 19. Opening/closing mechanism 22 is controlled by a machine control system 24. After door 30 is closed, opening/closing mechanism 22 is driven through a cartridge opening stroke to peel cover 38 from tray 36 and provide access to film therein. Opening/closing mechanism 22 is driven through a cartridge closing stroke to reseal cover 38 on tray 36 and thereby close cartridge 18 before drawer 30 is opened and the cartridge removed.

During the cartridge opening stroke, the solenoid actuated linkage couples motor 100 to roller gear drive assembly 98, while disengaging the motor from track gear drive assemblies 96L and 96R. Pressure roller 82 is thereby rotated by motor 100 while carriage 69 is free to move along guide track 22. As pressure roller 82 rotates, its fingers 88 will engage apertures 42 and wind cover 38 onto the roller. Continued winding of cover 38 onto roller 82 causes carriage 69 to be driven or "pulled" toward rear wall 48B of cartridge 18, thereby opening the cartridge.

During the cartridge closing stroke, the solenoid actuated linkage couples motor 100 to track gear drive assemblies 96L, while disengaging the motor from roller gear drive assembly 98. Track gear drive assembly 96R is driven by gear drive assembly 96L through axle 97. The rotation of motor 100 causes gear drive assemblies 96L and 96R to synchronously drive carriage 69 toward cartridge front wall 66A through engagement with racks 94L and 94R, respectively. Pressure roller 82 is free to rotate as carriage 69 is driven back toward and over the front lip 50A of cartridge tray 36. Cover 38 is thereby unwound from pressure roller 82, and adhesively resealed to tray 36 through the force exerted by the roller. A more detailed description of resealable cartridge 18 and opening and closing mechanism 22 is found in commonly assigned copending U.S. Patent application Ser. No. 07/656,734 filed on even date herewith and entitled "Opening And Closing Mechanism For A Laser Imager Film Cartridge", which is hereby incorporated by reference.

Bar code scanner 20 also scans bar code 19 through bar code access opening 68 during the cartridge opening stroke. Information encoded onto bar code 19 is therefore read from the associated cartridge 18 at the same time cover 38 is peeled off the cartridge. Machine control system 24 controls the operation of scanner 20 as the information is read from bar code 19 during the scan, and transfers the scanned information to IMS 14. Other information read from bar code 19 is used by machine control system 24 to control imager 12.

The film/cartridge information encoded onto bar code 19 can include film information representative of properties and characteristics of film within the cartridge 18. Alternatively or in addition to the film information, cartridge information which uniquely identifies cartridge 18 and its manufacturing history can be encoded onto bar code 19. In one embodiment of imaging system 10, the types of film information encoded onto bar code 19 includes information describing the size of the film within cartridge 18, the type of the film and/or film sensitometric information.

In one embodiment, bar code 19 is printed on adhesive label stock such as 3M ScotchMark 7863 label stock. The labels bearing bar code 19 are applied to platform 58 as cartridge 18 is manufactured. In the embodiment shown in FIG. 4, bar code 19 includes a clock section 110 and data sections 112, 114 and 116 positioned on opposite sides of the clock section. Data sections 112, 114 and 116 are divided into a number of fields of varying bit lengths(not separately shown). The film/cartridge information described above is encoded in predetermined fields within data sections 112, 114 and 116. Clock section 110 includes evenly sized and regularly spaced bars at a spatial frequency which is twice the spatial frequency of the bars in data sections 112, 114 and 116

In the embodiment shown in FIG. 6, bar code scanner 20 includes four separate electro-optical devices 121. Each device 121 is positioned to scan one of clock section 110 and data sections 112, 114 and 116 of bar code 19. Devices 121 are Sharp GP2S05 photo interrupters with lenses in one embodiment.

The film/cartridge information read from code 19 when cartridge 18 is opened is used to control the operation of imaging system 10. As shown in FIG. 1, IMS 14 includes system controller 120, image memory 122 and image processing electronics 124. System controller 120 is a microprocessor based system including associated RAM and ROM (not separately shown) which controls the operation of IMS 14 and interfaces the IMS to imager 12 and film processor 16. System controller 120 is also interfaced to image memory 122 and image processing electronics 124. Image input data received by IMS 14 is temporarily stored in image memory 122 under the control of system controller 120. Because of the nonlinear relationship between the image input data and its useful visual representation, and the nonlinear sensitometric response of the film to different intensities of radiation from laser scanning system 28, image processing electronics 124 maps and scales the image input data to an appropriate range of exposure values for driving laser scanning system 28. This mapping operation is performed as a function of the information read from bar code 19. Through machine control system 24, system controller 120 controls the transfer of the exposure values to laser scanning system 28. Laser scanning system 28 generates a beam of radiation and scans the beam across the film as a function of information read from bar code 19. As the laser beam is being scanned, its intensity is modulated as a function of the exposure values to expose pixels of the image. The imaged film is then transported to film processor 16 and developed as a function of the information read from bar code 19. These operations are described in greater detail below.

Since film cartridges 18 are resealable, they can be removed from imager 12 whenever it is desired to load another cartridge containing a different type or size of film, without wasting any film which may remain in the cartridge. A record or information log for each cartridge 18 loaded into imager 12 is maintained by system controller 120 using the unique cartridge ID information read from the associated bar code 19. Whenever a new cartridge 18 is loaded into imager 12 and its unique ID has been determined, system controller 120 determines whether or not the cartridge is one which was previously loaded into and removed from the imager, or is a new and previously unused cartridge. If the cartridge 18 is a previously unused cartridge, system controller 120 creates a record for the cartridge. System controller 120 also has access to information specifying the number of sheets of film in a new cartridge. This full cartridge film count information can be programmed as a function of cartridge type. Controller 120 can then determine the full cartridge film count on the basis of cartridge type information read from the bar code. Alternatively, full cartridge film count information can be read directly from bar code 19.

The records maintained by system controller 120 for each cartridge 18 includes information specifying the number of sheets of film removed from or the number of sheets of film remaining in the cartridge. A visual splay of this information can be provided to an operator through display 29. System controller 120 can also use this information to provide a warning on display 29 in the event the supply of film in a cartridge 18 is depleted. The operation of imager 12 in the absence of film within cartridge 18 can also be inhibited by system controller 120 using this information.

Film size information read from bar code 19 is used directly by imager machine control system 24 to control laser scanning system 28. Imager 12 can therefore be quickly configured to image film of differing sizes.

Film sensitometric information and film type information read from bar code 19 are used by image processing electronics 124 to control the mapping of image input data to corresponding exposure values. In one embodiment of IMS 14, image processing electronics 124 includes stored data describing a set of standard image input data to image density transfer functions. Image processing electronics 124 uses the sensitometric information in this embodiment along with a transfer function selected as a function of the scanned sensitometric information to calculate a lookup table for the precise characteristics of the film currently loaded in the imager. In other embodiments, the sensitometric information read from bar code 19 is a sequence of set points used by image processing electronics 124 to create the appropriate lookup table transfer function data for the film. System controller 120 can also include a real time clock (not separately shown), and use the time difference between the current date and the film manufacturing date (read from bar code 19) to adjust the lookup table transfer function data in accordance with programmed relationships to account for known aging characteristics of the film.

Film type information read from bar code 19 is used by film processor 16. Parameters of the film developing process implemented by film developer 16 differ for different types of film. In one embodiment of imaging system 10, film processor 16 includes a microprocessor-based control system (not shown) with process control information for different types of film stored in associated memory. Film type information read from bar code 19 is transferred to film processor 16 from system controller 120, and used by the processor control system to determine the appropriate process control information for the type of film being developed. In other embodiments, system controller 120 controls film processor 16 as a function of the film type information read from bar code 19.

The imaging system of the present invention offers a number of advantages over those of the prior art. The bar code scanning system is cost effective and reliable. Film and cartridge information read from the bar code enables the imaging system to accurately control the imaging and developing operations for different sizes and types of film. The system also enables easy and convenient operator interaction.

Although the present invention has been described with reference to preferred embodiments, those skilled in the art will recognize that changes may be made in form and detail without departing from the spirit and scope of the invention.

What is claimed is:

1. A laser imaging system, comprising:
   a reusable cartridge of photographic film;
   a machine readable information bearing medium having an optical bar code associated with the cartridge and including information characterizing the cartridge and/or film including unique cartridge ID information and film size information representative of the size of the film in the cartridge;
   a laser imager, including:
   a cartridge receiving;
   a cartridge opening and closing mechanism mounted to the carriage arranged to open and reseal the cartridge;
   a laser scanning system including a laser for imaging the film; and
   a reading device having an optical bar code scanner for reading the information from the information bearing medium; and
   an image management system responsive to image input data and coupled to the laser imager, for controlling the laser imager as a function of the input data and the information read from the information bearing medium and wherein the image management system stores film usage information representative of the amount of film remaining within the cartridge and causes the laser scanning system to be controlled as a function of the film size information.

2. The laser imaging system of claim 1 wherein:
   the system further includes a film processor coupled to the laser imager and to the image management system, for developing the imaged film; and the image management system controls the film processor as a function of the information read from the information bearing medium.

3. The laser imaging system of claim 1 wherein the system further includes mounts for mounting the information bearing medium to the cartridge.

4. The laser imaging system of claim 3 wherein the laser imager
further includes:
a carriage mounted for movement with respect to the cartridge receiving mechanism;
a carriage drive for driving the carriage with resect to the cartridge receiving mechanism; and
a mount for mounting the reading device to the carriage so the information is read from the information bearing medium as the carriage is driven with respect to the cartridge receiving mechanism.

5. The laser imaging system of claim 1 wherein:
the system further includes a display coupled to the image management system; and
the image management system controls the display as a function of the information read from the information bearing medium.

6. The laser imager of claim 1 wherein:
the information bearing medium includes sensitometric information for the film in the cartridge; and
the image management system further includes image processing electronics for processing the input data as a function of the sensitometric information.

7. The laser imaging system of claim 1 wherein:
the information bearing medium includes film type information representative of the type of film in the cartridge;
the system further includes a film processor coupled to the image management system and the laser imager, for developing the imaged film; and
the image management system causes the film processor to develop the imaged film as a function of the film type information.

8. A laser imaging system, comprising:
a reusable cartridge of photographic film, the cartridge including a machine readable information bearing medium having an optical bar code with information characterizing the cartridge and/or film including unique cartridge ID information and film size information representative of the size of the film in the cartridge;
a laser imager, including:
a cartridge receiving mechanism;
a cartridge opening and closing mechanism mounted to the cartridge arranged to open and reseal the cartridge;
a laser scanning system including a laser for imaging the film; and
a reading device having an optical bar code scanner for reading the information from the information bearing medium;
a film processor for developing the imaged film; and
an image management system connected to receive digital image input data representative of an image and coupled to the laser imager and film processor, the image management system including processing means for controlling the laser imager and film processor as a function of the image input data and the information read from the information bearing medium and wherein the image management system stores film usage information representative of the amount of film remaining within the cartridge and causes the laser scanning system to be controlled as a function of the film size information.

9. The laser imaging system of claim 8 wherein:
the laser imager further includes:
a carriage mounted for movement with respect to the cartridge receiving mechanism;
a carriage drive for driving the carriage with respect to the cartridge receiving mechanism; and
a mount for mounting the reading device to the carriage; and
the image management system further includes processing means for actuating the carriage drive and causing the information to be read from the information bearing medium as the carriage is driven with respect to the cartridge receiving mechanism.

10. The laser imaging system of claim 8 wherein:
the system further includes a display coupled to the image management system;
the image management system further includes processing means for controlling the display as a function of the information read from the information bearing medium.

11. The laser imaging system of claim 8 wherein:
the information bearing medium includes sensitometric information for the film in the cartridge; and
the image management system further includes image processing electronics for processing the image input data as a function of the sensitometric information.

12. The laser imaging system of claim 8 wherein:
the information bearing medium includes film size information representative of the size of the film in the cartridge; and
the image management system further includes processing means for controlling the laser scanning system as a function of the film size information.

* * * * *

UNITED STATES PATENT AND TRADEMARK OFFICE
CERTIFICATE OF CORRECTION

PATENT NO. : 5,229,585
DATED : July 20, 1993
INVENTOR(S) : Richard R. Lemberger and Terrence H. Joyce It is certified that error appears in the above-identified patent and that said Letters Patent is hereby corrected as shown below:

On title page, item [75] "Richard R. Lemberger; Terrence H. Joyce, both of St. Paul" should read -- Richard R. Lemberger of Forest Lake; and Terrence H. Joyce of Burnsville --.

Col. 7, Line 40, "splay" should read -- display --.

Column 8, claim 1, line 46, "a cartridge receiving;" should read --a cartridge receiving mechanism;--

Claim 4, Col. 9, Line 12, "resect" should read -- respect --.

Claim 8, Col 9, Line 52, "Cartridge" should read -- carriage --.

Signed and Sealed this

Sixteenth Day of August, 1994

Attest:

BRUCE LEHMAN

*Attesting Officer*   *Commissioner of Patents and Trademarks*